United States Patent
McCulloch et al.

(10) Patent No.: US 9,280,972 B2
(45) Date of Patent: Mar. 8, 2016

(54) SPEECH TO TEXT CONVERSION

(71) Applicant: MICROSOFT TECHNOLOGY LICENSING, LLC, Redmond, WA (US)

(72) Inventors: Daniel McCulloch, Kirkland, WA (US); Abby Lin Lee, Seattle, WA (US); Adam Benjamin Smith-Kipnis, Seattle, WA (US); Jonathan William Plumb, Seattle, WA (US); Alexandre David, Seattle, WA (US); Michael O Hale, Bellevue, WA (US); Jeff Cole, Seattle, WA (US); Hendrik Mark Langerak, Bellevue, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 252 days.

(21) Appl. No.: 13/892,094

(22) Filed: May 10, 2013

(65) Prior Publication Data
US 2014/0337023 A1  Nov. 13, 2014

(51) Int. Cl.
*G10L 15/00* (2013.01)
*G10L 15/26* (2006.01)
*G06F 1/16* (2006.01)

(52) U.S. Cl.
CPC ............. *G10L 15/26* (2013.01); *G06F 1/163* (2013.01)

(58) Field of Classification Search
None
See application file for complete search history.

(56) References Cited

U.S. PATENT DOCUMENTS

| 5,574,824 A | 11/1996 | Slyh et al. |
| 6,417,797 B1* | 7/2002 | Cousins et al. ............... 342/179 |
| 2006/0167687 A1 | 7/2006 | Kates |
| 2014/0081634 A1* | 3/2014 | Forutanpour et al. ......... 704/235 |

FOREIGN PATENT DOCUMENTS

| WO | 2011156195 A2 | 12/2011 |
| WO | 2013049248 A2 | 4/2013 |

OTHER PUBLICATIONS

ISA European Patent Office, International Search Report & Written Opinion for PCT Patent Application No. PCT/US2014/037410, Jul. 31, 2014, WIPO, 11 Pages.
Vassilia et al., "Multimodal Continuous Recognition System for Greek Sign Language Using Various Grammars", In Proceedings of the 4th Hellenic Conference on Artificial Intelligence, May 18, 2006, 4 pages.

(Continued)

*Primary Examiner* — Benny Q Tieu
*Assistant Examiner* — Sunil Chacko
(74) *Attorney, Agent, or Firm* — Dan Choi; Judy Yee; Micky Minhas

(57) ABSTRACT

Embodiments that relate to converting audio inputs from an environment into text are disclosed. For example, in one disclosed embodiment a speech conversion program receives audio inputs from a microphone array of a head-mounted display device. Image data is captured from the environment, and one or more possible faces are detected from image data. Eye-tracking data is used to determine a target face on which a user is focused. A beamforming technique is applied to at least a portion of the audio inputs to identify target audio inputs that are associated with the target face. The target audio inputs are converted into text that is displayed via a transparent display of the head-mounted display device.

18 Claims, 5 Drawing Sheets

(56) References Cited

OTHER PUBLICATIONS

Sujatha et al., "Lip Feature Extraction for Visual Speech Recognition Using Hidden Markov Model", In International Conference on Computing, Communication and Applications, Feb. 22, 2012, 5 Pages.

Duchnowski et al., "Toward Movement-Invariant Automatic Lip-Reading and Speech Recognition", In International Conference on Acoustics, Speech, and Signal Processing, vol. 1, May 9, 1995, pp. 109-112.

Mirzaei et al., "Combining Augmented Reality and Speech Technologies to Help Deaf and Hard of Hearing People", Retrieved at <<http://ieeexplore.ieee.org/stamp/stamp.jsp?tp=&arnumber=6297574>>, "In Proceedings of 14th Symposium of Virtual and Augmented Reality", May 28, 2012, pp. 8.

Guenebaut, Boris, "Automatic Subtitle Generation for Sound in Videos", Retrieved at <<hj.diva-portal.org/smash/get/diva2:241802/FULLTEXT01>>, In Thesis of Software Engineering Department of Economics and IT, May 2009, pp. 35.

Sun et al., "Integrating Adaptive Beam-forming and Auditory Features for Robust Large Vocabulary Speech Recognition", Retrieved at <<http://lilabs.com/info/pdf/conf/interSpeech2012demo.pdf>>, In proceedings of 13th Annual Conference of the International Speech Communication Association, Sep. 9, 2012, pp. 2.

Sawada et al., "Improvement of Speech Recognition Performance for Spoken-Oriented Robot Dialog System Using End-Fire Array", Retrieved at <<http://ieeexplore.ieee.org/stamp/stamp.jsp?tp=&arnumber=5648924>>, In Intelligent Robots and Systems, IEEE/RSJ International conference, Oct. 18, 2010, pp. 6.

Seltzer, Michael L., "Microphone Array Processing for Robust Speech Recognition", Retrieved at <<http://www.cs.cmu.edu/~mseltzer/papers/phd_proposal.pdf>>, In Thesis of Department of Electrical and Computer Engineering in Partial Fulfillment of the Requirements for the Degree of Doctor of Philosophy, Jun. 2001, pp. 27.

* cited by examiner

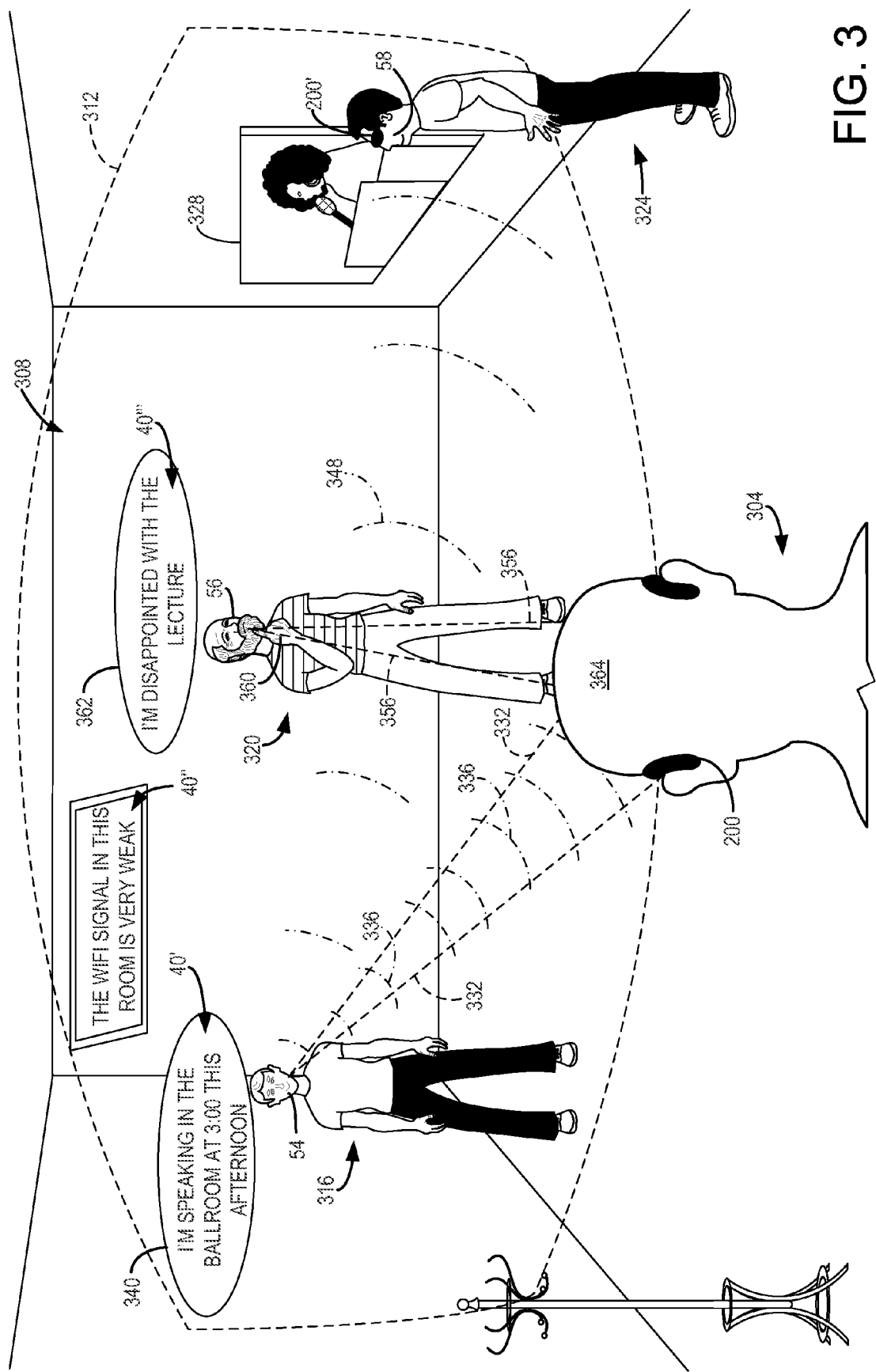

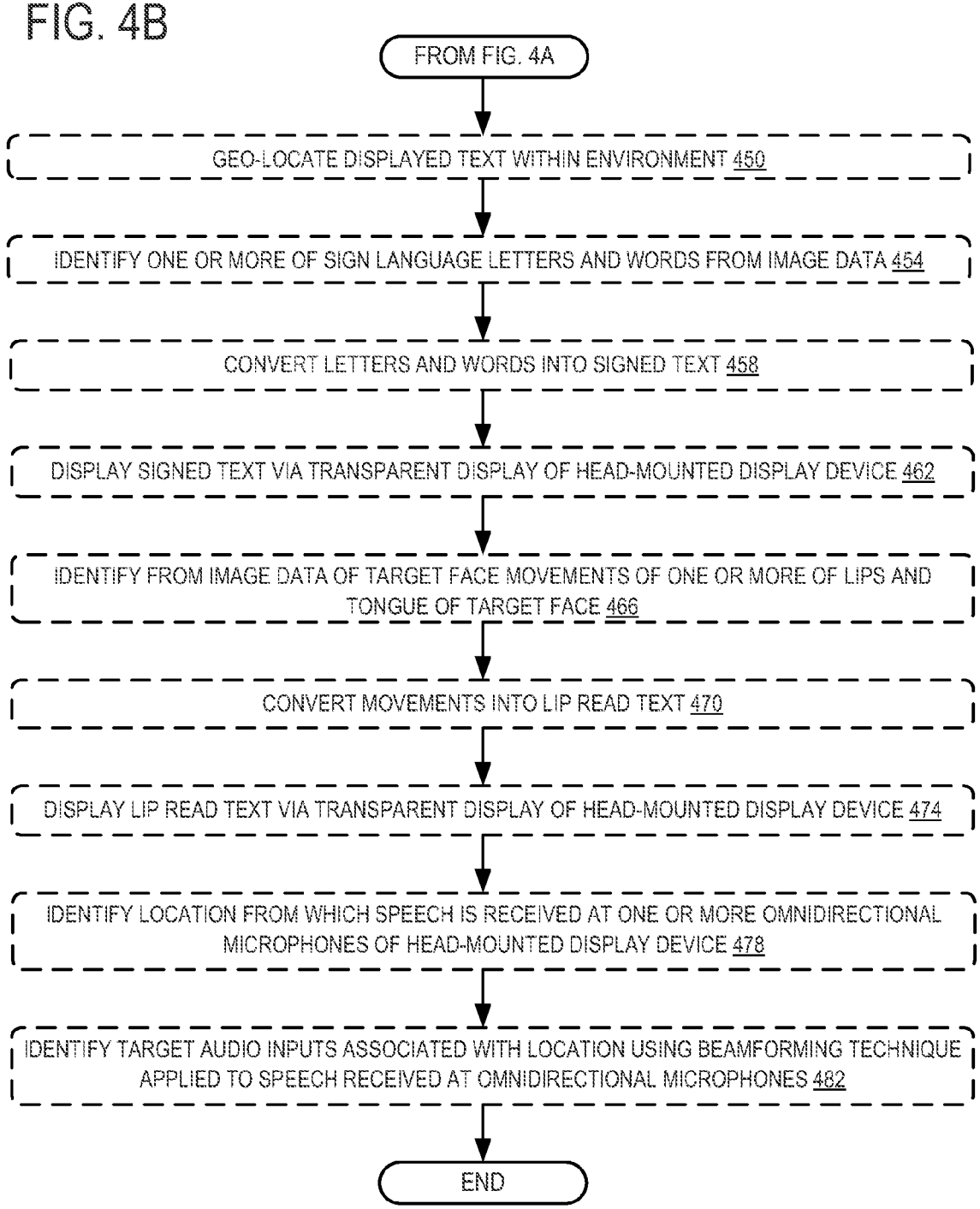

SPEECH TO TEXT CONVERSION

BACKGROUND

Persons with hearing impairments may use one or more techniques to understand audible speech and/or other sounds originating from another person or a device. For example, where a speaker is speaking and a hearing impaired person can see the speaker's mouth, the person may use lip reading techniques to understand the content of the speech. However, to use such techniques necessitates that the person learn lip reading techniques. Further, where the person's view of the speaker's mouth is limited or blocked, such techniques may offer less than satisfactory assistance.

Another possibility is for a third party to translate the speech to a particular sign language which may be understood by a person knowledgeable in that sign language. A third party may also transcribe the speech into a written form which may be read by the person. However, having a third party available to perform such translation or transcription imposes significant constraints.

Another approach may use speech recognition technology to receive, interpret, and visually present speech to a hearing impaired person. However, the accuracy of such technology typically suffers when the speaker does not speak clearly and directly into the receiving microphone, and/or when background noise is excessive. Accordingly, and especially in noisy and crowded environments, such technology may be impractical and less than helpful. Further, able-hearing persons may also encounter situations involving many people and/or excessive noise, such as social gatherings, trade shows, etc., in which it is difficult or impossible to hear another person's speech.

SUMMARY

Various embodiments are disclosed herein that relate to speech conversion systems. For example, one disclosed embodiment provides a method for converting audio inputs from an environment into text. The method includes capturing image data from the environment and detecting from the image data one or more possible faces. Eye-tracking data from an eye-tracking system of a head-mounted display device is used to determine a target face on which a user is focused.

A beamforming technique is applied to audio inputs from a microphone array in the head-mounted display device to identify target audio inputs that are associated with the target face. The method includes converting the target audio inputs into text. The method further includes displaying the text via a transparent display of the head-mounted display device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 3 is a schematic perspective view of a user wearing the head-mounted display device of FIG. 2 in a room with three other persons.

FIGS. 4A and 4B are a flow chart of a method for converting audio inputs from an environment into text according to an embodiment of the present disclosure.

DETAILED DESCRIPTION

Figure 1:
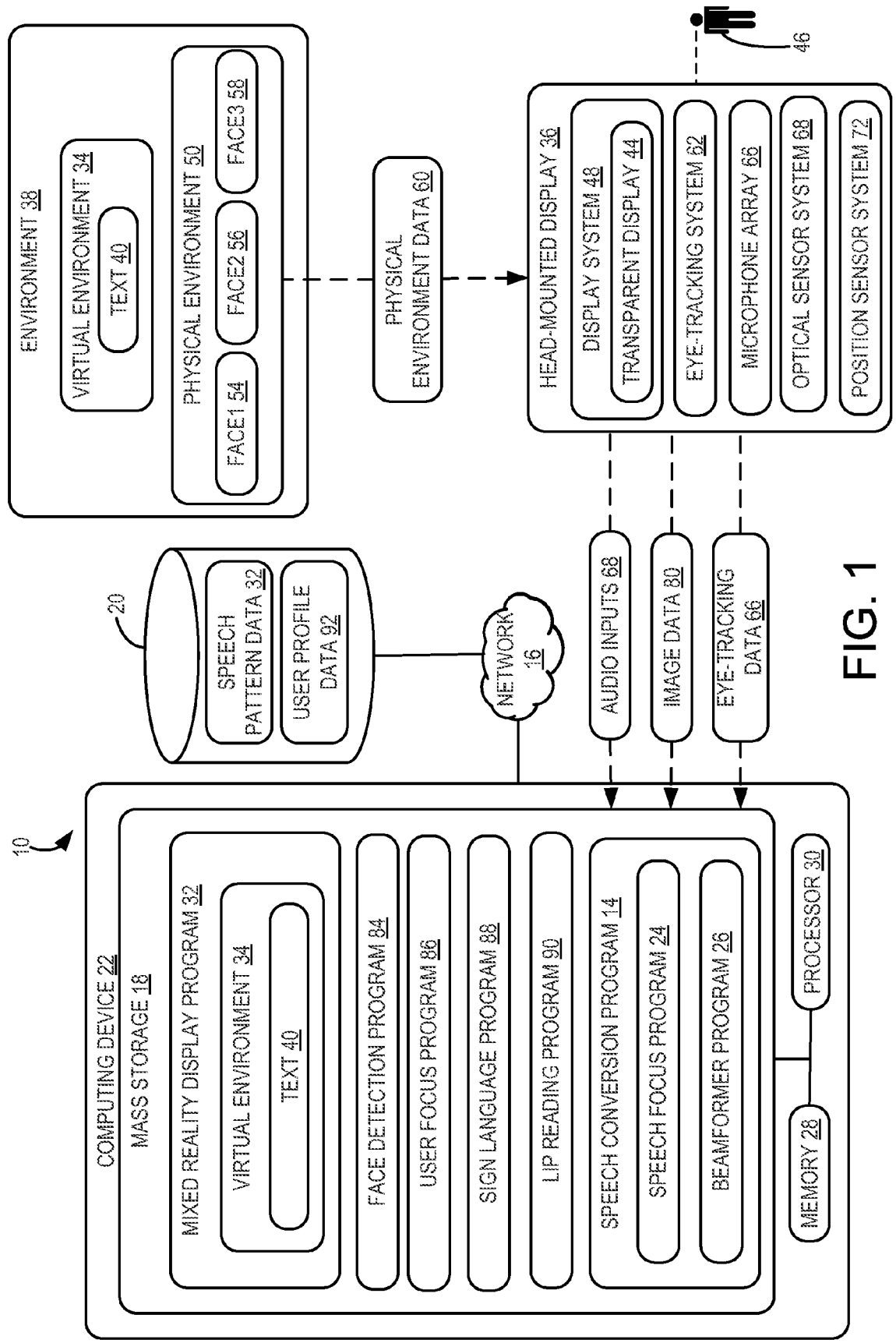
FIG. 1 is a schematic view of a speech conversion system according to an embodiment of the present disclosure.

FIG. 1 shows a schematic view of one embodiment of a speech conversion system 10. The speech conversion system 10 includes a speech conversion program 14 that may be stored in mass storage 18 of a computing device 22. As described in more detail below, the speech conversion program 14 may include a speech focus program 24 and a beamformer program 26.

The speech conversion program 14 may be loaded into memory 28 and executed by a processor 30 of the computing device 22 to perform one or more of the methods and processes described in more detail below. Also as described in more detail below, the mass storage 18 may further include a face detection program 84, user focus program 86, sign language program 88, and lip reading program 90.

The speech conversion system 10 includes a mixed reality display program 32 that may generate a virtual environment 34 for display via a display device, such as the head-mounted display (HMD) device 36, to create a mixed reality environment. The virtual environment 34 may include one or more virtual objects. Such virtual objects may include one or more virtual images, such as three-dimensional holographic images and other virtual objects, such as two-dimensional virtual objects. As described in more detail below, such virtual objects may include text 40 that has been generated from target audio inputs received by the HMD device 36.

The computing device 22 may take the form of a desktop computing device, a mobile computing device such as a smart phone, laptop, notebook or tablet computer, network computer, home entertainment computer, interactive television, gaming system, or other suitable type of computing device. Additional details regarding the components and computing aspects of the computing device 22 are described in more detail below with reference to FIG. 5.

The computing device 22 may be operatively connected with the HMD device 36 using a wired connection, or may employ a wireless connection via WiFi, Bluetooth, or any other suitable wireless communication protocol. For example, the computing device 22 may be communicatively coupled to a network 16. The network 16 may take the form of a local area network (LAN), wide area network (WAN), wired network, wireless network, personal area network, or a combination thereof, and may include the Internet.

As described in more detail below, the computing device 22 may communicate with one or more other HMD devices and other computing devices, such as server 20, via network 16. Additionally, the example illustrated in FIG. 1 shows the computing device 22 as a separate component from the HMD device 36. It will be appreciated that in other examples the computing device 22 may be integrated into the HMD device 36.

Figure 2:
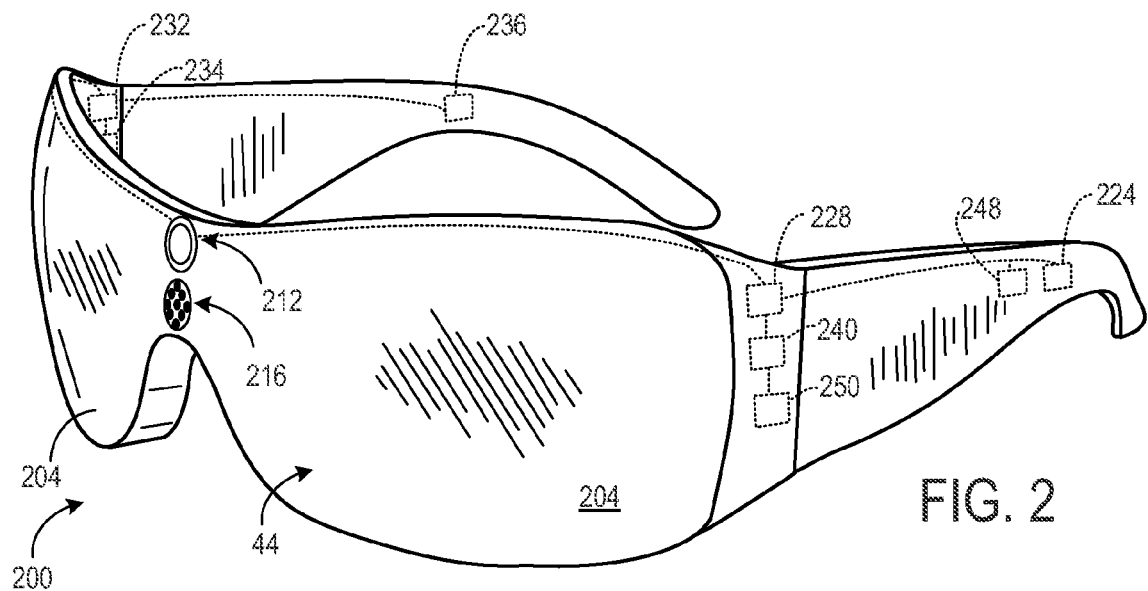
FIG. 2 shows an example head-mounted display device according to an embodiment of the present disclosure.

With reference now also to FIG. 2, one example of an HMD device 200 in the form of a pair of wearable glasses with a transparent display 44 is provided. It will be appreciated that in other examples, the HMD device 200 may take other suitable forms in which a transparent, semi-transparent or non-transparent display is supported in front of a viewer's eye or eyes. It will also be appreciated that the HMD device 36 shown in FIG. 1 may take the form of the HMD device 200, as described in more detail below, or any other suitable HMD device. Additionally, many other types and configurations of display devices having various form factors may also be used within the scope of the present disclosure. Such display devices may include, but are not limited to, hand-held smart phones, tablet computers, and other suitable display devices.

With reference to FIGS. 1 and 2, the HMD device 36 includes a display system 48 and transparent display 44 that enables images such as holographic objects to be delivered to the eyes of a user 46. The transparent display 44 may be configured to visually augment an appearance of a physical environment 50 to a user 46 viewing the physical environment through the transparent display. For example, the appearance of the physical environment 50 may be augmented by graphical content (e.g., one or more pixels each having a respective color and brightness) that is presented via the transparent display 44 to create a mixed reality environment.

The transparent display 44 may also be configured to enable a user to view a physical, real-world object, such as face1 54, face2 56, and face3 58, in the physical environment 50 through one or more partially transparent pixels that are displaying a virtual object representation. As shown in FIG. 2, in one example the transparent display 44 may include image-producing elements located within lenses 204 (such as, for example, a see-through Organic Light-Emitting Diode (OLED) display). As another example, the transparent display 44 may include a light modulator on an edge of the lenses 204. In this example the lenses 204 may serve as a light guide for delivering light from the light modulator to the eyes of a user. Such a light guide may enable a user to perceive a 3D holographic image located within the physical environment 50 that the user is viewing, while also allowing the user to view physical objects in the physical environment, thus creating a mixed reality environment.

The HMD device 36 may also include various sensors and related systems. For example, the HMD device 36 may include an eye-tracking system 62 that utilizes at least one inward facing sensor 216. The inward facing sensor 216 may be an image sensor that is configured to acquire image data in the form of eye-tracking data 66 from a user's eyes. Provided the user has consented to the acquisition and use of this information, the eye-tracking system 62 may use this information to track a position and/or movement of the user's eyes.

In one example, the eye-tracking system 62 includes a gaze detection subsystem configured to detect a direction of gaze of each eye of a user. The gaze detection subsystem may be configured to determine gaze directions of each of a user's eyes in any suitable manner. For example, the gaze detection subsystem may comprise one or more light sources, such as infrared light sources, configured to cause a glint of light to reflect from the cornea of each eye of a user. One or more image sensors may then be configured to capture an image of the user's eyes.

Images of the glints and of the pupils as determined from image data gathered from the image sensors may be used to determine an optical axis of each eye. Using this information, the eye-tracking system 62 may then determine a direction and/or at what physical object or virtual object the user is gazing. Such eye-tracking data 66 may then be provided to the computing device 22. It will be understood that the gaze detection subsystem may have any suitable number and arrangement of light sources and image sensors.

The HMD device 36 may also include sensor systems that receive physical environment data 60, including audio inputs, from the physical environment 50. For example, the HMD device 36 may include an optical sensor system 68 that utilizes at least one outward facing sensor 212, such as an optical sensor. Outward facing sensor 212 may detect movements within its field of view, such as gesture-based inputs or other movements performed by a user 46 or by a person or physical object within the field of view. Outward facing sensor 212 may also capture two-dimensional image information and depth information from physical environment 50 and physical objects within the environment. For example, outward facing sensor 212 may include a depth camera, a visible light camera, an infrared light camera, and/or a position tracking camera.

The HMD device 36 may include depth sensing via one or more depth cameras. In one example, each depth camera may include left and right cameras of a stereoscopic vision system. Time-resolved images from one or more of these depth cameras may be registered to each other and/or to images from another optical sensor such as a visible spectrum camera, and may be combined to yield depth-resolved video.

In other examples a structured light depth camera may be configured to project a structured infrared illumination, and to image the illumination reflected from a scene onto which the illumination is projected. A depth map of the scene may be constructed based on spacings between adjacent features in the various regions of an imaged scene. In still other examples, a depth camera may take the form of a time-of-flight depth camera configured to project a pulsed infrared illumination onto a scene and detect the illumination reflected from the scene. It will be appreciated that any other suitable depth camera may be used within the scope of the present disclosure.

Outward facing sensor 212 may capture images of the physical environment 50 in which a user 46 is situated. In one example, the mixed reality display program 32 may include a 3D modeling system that uses such input to generate a virtual environment 34 that models the physical environment 50 surrounding the user 46.

The HMD device 36 may also include a position sensor system 72 that utilizes one or more motion sensors 220 to enable motion detection, position tracking and/or orientation sensing of the HMD device. For example, the position sensor system 64 may be utilized to determine a direction, velocity and acceleration of a user's head. The position sensor system 64 may also be utilized to determine a head pose orientation of a user's head. In one example, position sensor system 64 may comprise an inertial measurement unit configured as a six-axis or six-degree of freedom position sensor system. This example position sensor system may, for example, include three accelerometers and three gyroscopes to indicate or measure a change in location of the HMD device 36 within three-dimensional space along three orthogonal axes (e.g., x, y, z), and a change in an orientation of the HMD device about the three orthogonal axes (e.g., roll, pitch, yaw).

Position sensor system 64 may also support other suitable positioning techniques, such as GPS or other global navigation systems. Further, while specific examples of position sensor systems have been described, it will be appreciated that other suitable position sensor systems may be used. In some examples, motion sensors 220 may also be employed as user input devices, such that a user may interact with the HMD device 36 via gestures of the neck and head, or even of the body.

The HMD device 36 may also include a microphone array 66 that includes one or more microphones rigidly mounted to the HMD device. In the example illustrated in FIG. 2, an array of 6 microphones 224, 228, 232, 236, 240, and 244 may be provided that are positioned at various locations around a user's head when the user wears the HMD device 200. In one example, all 6 microphones 224, 228, 232, 236, 240, and 244 may be omnidirectional microphones configured to receive speech and other audio inputs from the physical environment 50.

In another example, microphones 224, 228, 232, and 236 may be omnidirectional microphones, while microphones 240 and 244 may be unidirectional microphones that are configured to receive speech from the user 46 who wears the HMD device 200. It will also be appreciated that in other examples, the number, type and/or location of microphones around the HMD device 200 may be different, and that any suitable number, type and arrangement of microphones may be used. In still other examples, audio may be presented to the user via one or more speakers 248 on the HMD device 36.

The HMD device 36 may also include a processor 250 having a logic subsystem and a storage subsystem, as discussed in more detail below with respect to FIG. 5, that are in communication with the various sensors and systems of the HMD device. In one example, the storage subsystem may include instructions that are executable by the logic subsystem to receive signal inputs from the sensors and forward such inputs to computing device 22 (in unprocessed or processed form), and to present images to a user via the transparent display 44.

It will be appreciated that the HMD device 36 and related sensors and other components described above and illustrated in FIGS. 1 and 2 are provided by way of example. These examples are not intended to be limiting in any manner, as any other suitable sensors, components, and/or combination of sensors and components may be utilized. Therefore it is to be understood that the HMD device 36 may include additional and/or alternative sensors, cameras, microphones, input devices, output devices, etc. without departing from the scope of this disclosure. Further, the physical configuration of the HMD device 36 and its various sensors and subcomponents may take a variety of different forms without departing from the scope of this disclosure.

With reference now to FIG. 3, descriptions of example use cases and embodiments of the speech conversion system 10 will now be provided. FIG. 3 provides a schematic illustration of a user 304 located in a physical environment comprising a room 308 and experiencing a mixed reality environment via an HMD device 36 in the form of HMD device 200. Viewing the room 308 through the transparent display 44 of the HMD device 200, the user 304 may have a field of view 312 that includes a first person 316 having a face1 54, second person 320 having a face2 56, and third person 324 having a face3 58. A wall-mounted display 328 may also be within the field of view 312 of the user 304.

The optical sensor system 68 of the HMD device 200 may capture image data 80 from the room 308, including image data representing one or more possible faces, such as face1 54, face2 56, and face3 58. The face detection program 84 of the computing device 22 may detect from the image data 80 one or more of the face1 54, face2 56, and face3 58. To detect a face image in the image data, the face detection program 84 may use any suitable face detection technologies and/or algorithms including, but not limited to, local binary patterns (LBP), principal component analysis (PCA), independent component analysis (ICA), evolutionary pursuit (EP), Elastic Bunch Graph Matching (EBGM), or other suitable algorithm or combination of algorithms.

In some examples, the user 304 may have a hearing impairment that can make understanding speech difficult, particularly in an environment with multiple speakers and/or significant background noise. In the example shown in FIG. 3, each of the first person 316, second person 320 and third person 324 may be speaking simultaneously. The wall-mounted display 328 may also be emitting audio. All of these audio inputs 68 may be received by the microphones 224, 228, 232, 236, 240, and 244 of the HMD device 200.

In one example, the user 304 may desire to listen to and/or converse with the first person 316. The user 304 may be gazing at the first person 316, as indicated by gaze lines 332. Eye-tracking data 66 corresponding to the user's gaze may be captured by the eye-tracking system 62 and provided to the computing device 22. Using the eye-tracking data 66 and the image data 80, the user focus program 86 may determine that the user 304 is focused on face1 54 of the first person 316, designated the target face.

A location of target face1 54 of the first person 316 relative to the HMD device 200 may be determined. In some examples, the eye-tracking data 66, image data 80 such as depth information received by the optical sensor system 68, and/or position information generated by the position sensor system 72 may be used to determine the location of face1 54.

Using the location of target face1 54, the speech conversion program 14 may use the beamformer program 26 to apply one or more beamforming techniques to at least a portion of the audio inputs 68 from the microphone array 66. Alternatively expressed, one or more beamforming techniques may be applied to portions of audio inputs 68 that originate from the location of target face1 54. In this manner, the beamformer program 26 may identify target audio inputs, generally indicated at 336 in FIG. 3, that are associated with the face1 54 of the first person 316. In the example shown in FIG. 3, the target audio inputs may correspond to the first person 316 saying, "I'm speaking in the ballroom at 3:00 this afternoon."

In other examples, a speech focus program 24 may utilize the differences in time at which the audio inputs 68 are received at each of the microphones in the microphone array 66 to determine a direction from which the sounds were received. For example, the speech focus program 24 may identify a location from which speech is received relative to one or more of omnidirectional microphones of the HMD device 200. Using the beamformer program 26, the speech conversion program 14 may then apply a beamforming technique to the speech and identify the target audio inputs that are associated with the location from which the speech is received.

In some examples, the beamformer program 26 may be configured to form a single, directionally-adaptive sound signal that is determined in any suitable manner. For example, the directionally-adaptive sound signal may be determined based on a time-invariant beamforming technique, adaptive beamforming technique, or a combination of time-invariant and adaptive beamforming techniques. The resulting combined signal may have a narrow directivity pattern, which may be steered in a direction of a speech source, such as the location of face1 54 of the first person 316. It will also be appreciated that any suitable beamforming technique may be used to identify the target audio inputs associated with the target face.

With continued reference to FIGS. 1 and 3, the speech conversion program 14 may be configured to convert the target audio inputs into text 40, and to display the text 40 via the transparent display 44 of the HMD device 200. In the example shown in FIG. 3, the target audio inputs 336 may be converted to text 40' that is displayed by HMD device 200 above the head of the first person 316 in a text bubble 340, thereby enabling user 304 to easily associate the text with the first person.

In one example, the speech conversion program 14 may tag the text 40' to the first person 316 such that the text bubble 340 is spatially anchored to the first person and follows the first person as the first person moves. In another example and as discussed in more detail below, an identity associated with a target face, such as face1 54 of the first person 316, may be determined, and the text 40' may be tagged to the person corresponding to the identity.

In another example, the displayed text 40' may be geo-located within the room 308. In one example, while standing in the room 308, the user 304 may state, "The WiFi signal in this room is very weak" as shown in displayed text 40". This speech may be captured and converted to text by the speech conversion system 10. Because this statement relates particularly to the room 308, displayed text 40" may be geo-located to the room 308. Accordingly, displayed text 40" may remain visible to the user 304 and spatially anchored to the room 308.

In one example, the displayed text 40" may remain geo-located to the room 308 for a predetermined timeframe. In this manner, whenever the user 304 enters the room 308 within the timeframe, the text 40" will be displayed to the user 304 within the room. In other examples, the text 40" may also be displayed to one or more other users located in room 308 via their HMD devices 200.

In other examples, additional audio inputs from the room 308 may be received by the HMD device 200 from one or more external sources. For example, the third person 324 may also wear an HMD device 36 in the form of HMD device 200'. HMD device 200' may be communicatively coupled to HMD device 200 via, for example, network 16. The HMD device 200' may receive additional audio inputs from the room 308, including first person audio inputs 348 from the first person 316. These first person audio inputs 348 along with location data related to the inputs may be provided by HMD device 200' to HMD device 200. The HMD device 200' may use these additional audio inputs to identify the target audio inputs 336 received from first person 316, and/or to improve the quality and/or efficiency of the speech-to-text conversion of the target audio inputs.

As noted above, in some examples the face detection program 84 may be configured to determine an identity associated with a target face, such as face1 54 of the first person 316. In one example, the face detection program 84 may access user profile data 92 on server 20 to match image data including face1 54 with one or more images and related user profile information corresponding to first person 316. It will be appreciated that the face detection program 84 may use any suitable facial recognition techniques to match image data of face1 54 with stored images of first person 316.

In some examples, the speech conversion program 14 may utilize the identity associated with face1 54 to access speech pattern data 94 corresponding to the identity. The speech conversion program 14 may then use the speech pattern data 94 to convert the target audio inputs 336 into text 40. For example, the speech pattern data 94 may enable the speech conversion program 14 to more accurately and/or efficiently convert the target audio inputs 336 into text 40.

Additionally and as noted above, in some examples the displayed text 40' may be tagged to the first person 316 corresponding to the identity. In this manner, the speech conversion program 14 may tag the text 40' to the first person 316 such that the text bubble 340 is spatially anchored to the first person and follows the first person as the first person moves. In some examples, the text 40' and text bubble 340 anchored to first person 316 may also be displayed via other HMD devices, such as HMD device 200', where the other HMD device also determines an identity of the target face of the first person. Further, in some examples the text 40' and text bubble 340 may remain anchored to first person 316 and viewable via one or more HMD devices after the first person leaves the room 308. In this manner, other persons who encounter the first person 316 outside of the room 308 may benefit from viewing the text 40'.

In other examples, a sign language program 88 may be configured to identify sign language letters and/or words from the image data 80. With reference again to FIG. 3, in one example the second person 320 may be communicating with the third person 324 via a sign language, such as American Sign Language. The user 304 may be gazing at the second person 320 as indicated by gaze lines 356. As described above, eye-tracking data 66 corresponding to the user's gaze may be captured by the eye-tracking system 62 and used to determine that the user 304 is focused on face2 56 of the second person 320, or on the second person's right hand 360 that is making a sign language hand shape corresponding to a letter or word.

Using the image data 80, the sign language program 88 may identify the sign language letter or word corresponding to the hand shape formed by the user's right hand 360. The sign language program 88 may convert the letter or word into signed text. The signed text may then be displayed via the transparent display 44 of the HMD device 200. In the present example, the second person's right hand 360 is signing the word "disappointed." The sign language program 88 may interpret this hand shape and others that form the sentence, "I'm disappointed with the lecture." This sentence may be displayed as text 40''' in text bubble 362 located above the head of the second person 320.

In other examples, a lip reading program 90 may be configured to identify from the image data 80 movements of one or more of lips and a tongue of a target face. With reference again to FIG. 3, in one example the first person 316 may be speaking to the user 304. The user 304 may be gazing at the first person 316 as indicated by gaze lines 332. As described above, eye-tracking data 66 corresponding to the user's gaze may be captured by the eye-tracking system 62 and used to determine that the user 304 is focused on face1 54 of the first person 316.

Using the image data 80, the lip reading program 90 may identify movements of one or more of lips and a tongue of the face1 54. The lip reading program 90 may convert the movements into lip read text. The lip read text may then be displayed via the transparent display 44 of the HMD device 200.

In other examples, the speech conversion program 14 may sample the audio inputs 68 received at multiple omnidirectional microphones 224, 228, 232, 236, 240, and 244 in a repeated, sweeping manner across the microphones. For example and with reference to FIG. 2, the audio inputs 68 may be sampled sequentially from right to left beginning at microphone 224, continuing to microphones 240, 228, 232 and 234, and ending with microphone 236. During each such sweep, the speech conversion program 14 may analyze the audio inputs 68 received at each microphone to identify human voice audio. Using such analysis, the speech conversion program 14 may determine one or more locations from which human speech may be originating.

In other examples, head position data of the head 364 of the user 304, including head pose and/or head orientation data, may be used by the user focus program 86 to determine a target face on which the user is focused. Such head position data may be used alone or in combination with other location information as described above to determine a target face.

In other examples, text that has been converted from target audio inputs may be saved in mass storage 18 of computing device 22 and/or in storage subsystems of one or more other computing devices. Such saved text may be later accessed and displayed by the HMD device 36 and/or by other computing devices.

As mentioned above, in various examples the computing device 22 may be separated from or integrated into the HMD device 36. It will also be appreciated that in some examples one or more of the mixed reality display program 32, face detection program 84, user focus program 86, sign language program 88, lip reading program 90, and/or speech conversion program 14, and the related methods and process described above, may be located and/or executed on a computing device other than computing device 22, such as for example on the server 20 that is communicatively coupled to computing device 22 via network 16.

Figure 4A:
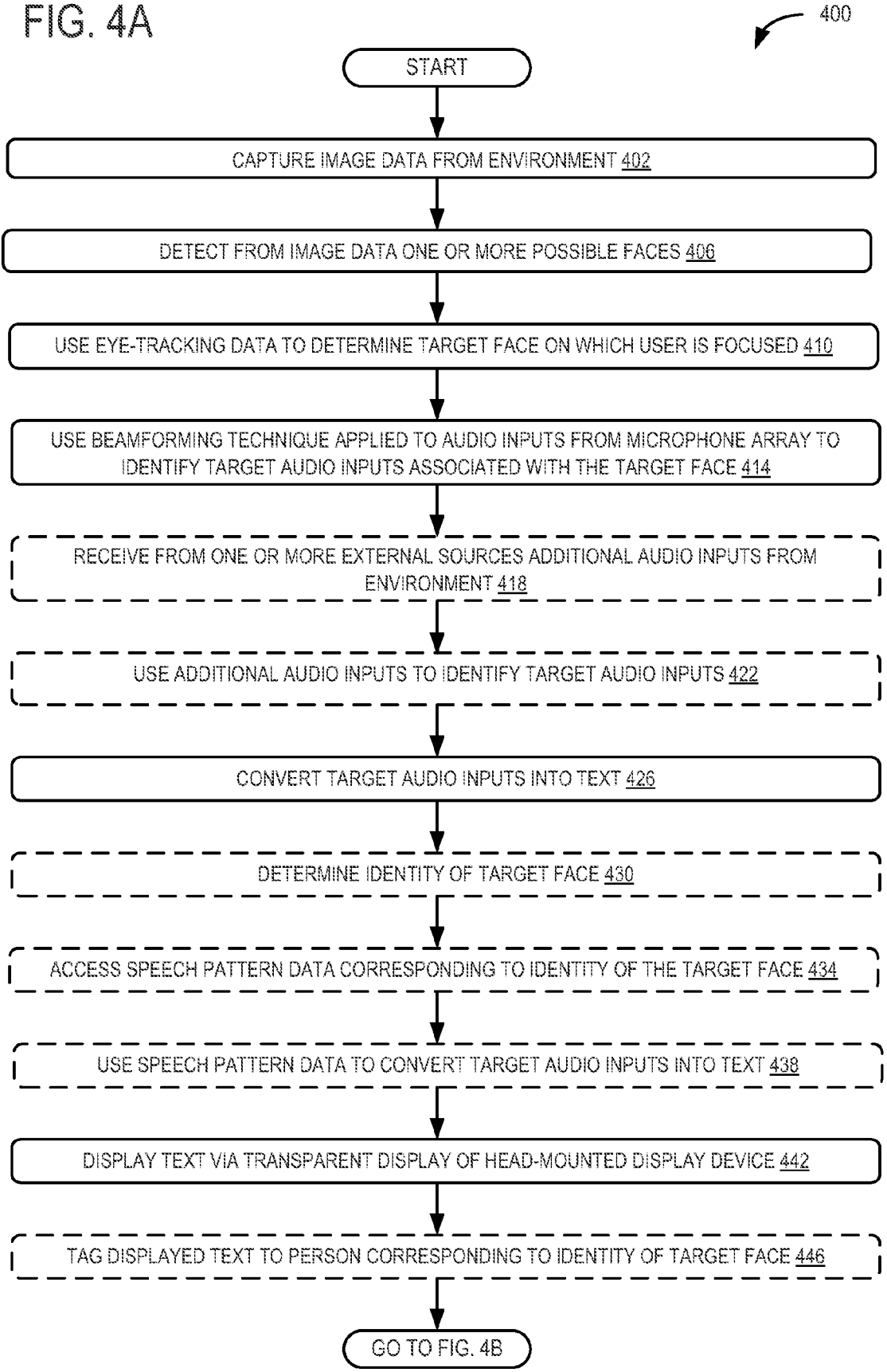

FIGS. 4A and 4B illustrate a flow chart of a method 400 for converting audio inputs from an environment into text according to an embodiment of the present disclosure. In this embodiment, the audio inputs are received at a microphone array of a head-mounted display device. The following description of method 400 is provided with reference to the software and hardware components of the speech conversion system 10 described above and shown in FIGS. 1-3. It will be appreciated that method 400 may also be performed in other contexts using other suitable hardware and software components.

With reference to FIG. 4A, at 402 the method 400 includes capturing image data from the environment. At 406 the method 400 includes detecting from the image data one or more possible faces. At 410 the method 400 includes using eye-tracking data from an eye-tracking system of the head-mounted display device to determine a target face on which a user is focused. At 414 the method 400 includes using a beamforming technique applied to at least a portion of the audio inputs from the microphone array to identify target audio inputs that are associated with the target face.

At 418 the method 400 may also include receiving from one or more external sources additional audio inputs from the environment. At 422 the method 400 may then also include using the additional audio inputs to identify the target audio inputs. At 426 the method 400 includes converting the target audio inputs into text. At 430 the method may also include determining an identity of the target face. At 434 the method 400 may include accessing speech pattern data corresponding to the identity of the target face. At 438 the method 400 may include using the speech pattern data to convert the target audio inputs into the text.

At 442 the method 400 includes displaying the text via a transparent display of the head-mounted display device. At 446 the method 400 may include tagging the displayed text to a person corresponding to the identity. With reference now to FIG. 4B, at 450 the method 400 may include geo-locating the displayed text within the environment. At 454 the method 400 may further include identifying one or more of sign language letters and words from the image data. At 458 the method 400 may include converting the letters and words into signed text. At 462 the method 400 may then include displaying the signed text via the transparent display of the head-mounted display device.

At 466 the method 400 may include identifying from the image data of the target face movements of one or more of lips and a tongue of the target face. At 470 the method 400 may include converting the movements into lip read text. At 474 the method 400 may then include displaying the lip read text via the transparent display of the head-mounted display device. At 478 the method 400 may include, where the microphones comprise omnidirectional microphones, identifying a location from which speech is received at one or more of the omnidirectional microphones. At 482 the method 400 may then include identifying the target audio inputs that are associated with the location using the beamforming technique applied to the speech received at the one or more omnidirectional microphones.

It will be appreciated that method 400 is provided by way of example and is not meant to be limiting. Therefore, it is to be understood that method 400 may include additional and/or alternative steps than those illustrated in FIGS. 4A and 4B. Further, it is to be understood that method 400 may be performed in any suitable order. Further still, it is to be understood that one or more steps may be omitted from method 400 without departing from the scope of this disclosure.

Figure 5:
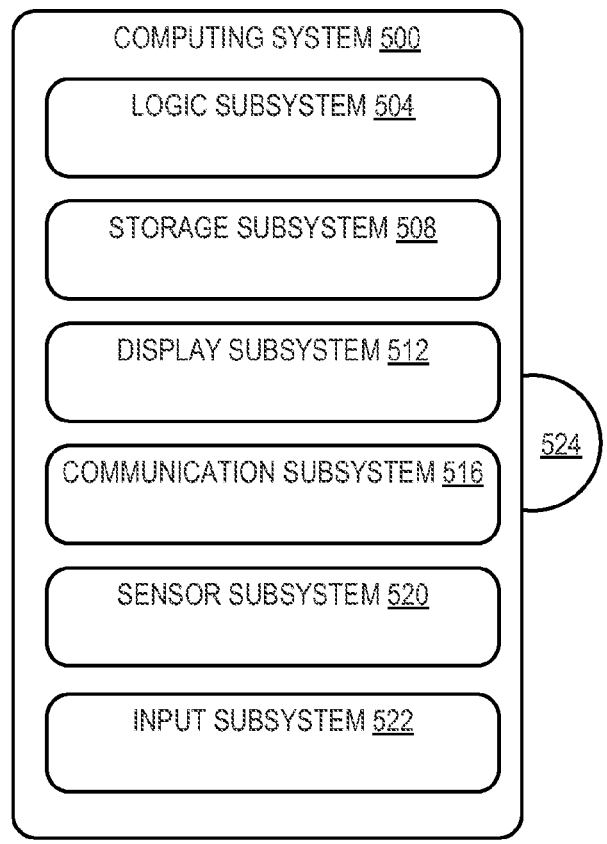
FIG. 5 is a simplified schematic illustration of an embodiment of a computing device.

FIG. 5 schematically shows a nonlimiting embodiment of a computing system 500 that may perform one or more of the above described methods and processes. Computing device 22 may take the form of computing system 500. Computing system 500 is shown in simplified form. It is to be understood that virtually any computer architecture may be used without departing from the scope of this disclosure. In different embodiments, computing system 500 may take the form of a mainframe computer, server computer, desktop computer, laptop computer, tablet computer, home entertainment computer, network computing device, mobile computing device, mobile communication device, gaming device, etc. As noted above, in some examples the computing system 500 may be integrated into an HMD device.

As shown in FIG. 5, computing system 500 includes a logic subsystem 504 and a storage subsystem 508. Computing system 500 may optionally include a display subsystem 512, a communication subsystem 516, a sensor subsystem 520, an input subsystem 522 and/or other subsystems and components not shown in FIG. 5. Computing system 500 may also include computer readable media, with the computer readable media including computer readable storage media and computer readable communication media. Computing system 500 may also optionally include other user input devices such as keyboards, mice, game controllers, and/or touch screens, for example. Further, in some embodiments the methods and processes described herein may be implemented as a computer application, computer service, computer API, computer library, and/or other computer program product in a computing system that includes one or more computers.

Logic subsystem 504 may include one or more physical devices configured to execute one or more instructions. For example, the logic subsystem 504 may be configured to execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem 504 may include one or more processors that are configured to execute software instructions. Additionally or alternatively, the logic subsystem may include one or more hardware or firmware logic machines configured to execute hardware or firmware instructions. Processors of the logic subsystem may be single core or multi-core, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

Storage subsystem 508 may include one or more physical, persistent devices configured to hold data and/or instructions executable by the logic subsystem 504 to implement the herein described methods and processes. When such methods and processes are implemented, the state of storage subsystem 508 may be transformed (e.g., to hold different data).

Storage subsystem 508 may include removable media and/or built-in devices. Storage subsystem 508 may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. Storage subsystem 508 may include devices with one or more of the following characteristics: volatile, nonvolatile, dynamic, static, read/write, read-only, random access, sequential access, location addressable, file addressable, and content addressable.

In some embodiments, aspects of logic subsystem 504 and storage subsystem 508 may be integrated into one or more common devices through which the functionally described herein may be enacted, at least in part. Such hardware-logic components may include field-programmable gate arrays (FPGAs), program- and application-specific integrated circuits (PASIC/ASICs), program- and application-specific standard products (PSSP/ASSPs), system-on-a-chip (SOC) systems, and complex programmable logic devices (CPLDs), for example.

FIG. 5 also shows an aspect of the storage subsystem 508 in the form of removable computer readable storage media 524, which may be used to store data and/or instructions executable to implement the methods and processes described herein. Removable computer-readable storage media 524 may take the form of CDs, DVDs, HD-DVDs, Blu-Ray Discs, EEPROMs, and/or floppy disks, among others.

It is to be appreciated that storage subsystem 508 includes one or more physical, persistent devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal via computer-readable communication media.

When included, display subsystem 512 may be used to present a visual representation of data held by storage subsystem 508. As the above described methods and processes change the data held by the storage subsystem 508, and thus transform the state of the storage subsystem, the state of the display subsystem 512 may likewise be transformed to visually represent changes in the underlying data. The display subsystem 512 may include one or more display devices utilizing virtually any type of technology. Such display devices may be combined with logic subsystem 504 and/or storage subsystem 508 in a shared enclosure, or such display devices may be peripheral display devices. The display subsystem 512 may include, for example, the display system 48 and transparent display 44 of the HMD device 36.

When included, communication subsystem 516 may be configured to communicatively couple computing system 500 with one or more networks and/or one or more other computing devices. Communication subsystem 516 may include wired and/or wireless communication devices compatible with one or more different communication protocols. As nonlimiting examples, the communication subsystem 516 may be configured for communication via a wireless telephone network, a wireless local area network, a wired local area network, a wireless wide area network, a wired wide area network, etc. In some embodiments, the communication subsystem may allow computing system 500 to send and/or receive messages to and/or from other devices via a network such as the Internet.

Sensor subsystem 520 may include one or more sensors configured to sense different physical phenomenon (e.g., visible light, infrared light, sound, acceleration, orientation, position, etc.) as described above. Sensor subsystem 520 may be configured to provide sensor data to logic subsystem 504, for example. As described above, such data may include eye-tracking information, image information, audio information, ambient lighting information, depth information, position information, motion information, user location information, and/or any other suitable sensor data that may be used to perform the methods and processes described above.

When included, input subsystem 522 may comprise or interface with one or more sensors or user-input devices such as a game controller, gesture input detection device, voice recognizer, inertial measurement unit, keyboard, mouse, or touch screen. In some embodiments, the input subsystem 522 may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

The term "program" may be used to describe an aspect of the speech conversion system 10 that is implemented to perform one or more particular functions. In some cases, such a program may be instantiated via logic subsystem 504 executing instructions held by storage subsystem 508. It is to be understood that different programs may be instantiated from the same application, service, code block, object, library, routine, API, function, etc. Likewise, the same program may be instantiated by different applications, services, code blocks, objects, routines, APIs, functions, etc. The term "program" is meant to encompass individual or groups of executable files, data files, libraries, drivers, scripts, database records, etc.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A speech conversion system for converting audio inputs from an environment into text, comprising:
   a head-mounted display device operatively connected to a computing device, the head-mounted display device comprising:

a display system including a transparent display;
an eye-tracking system for tracking a gaze of a user's eye;
a microphone array including a plurality of microphones rigidly mounted to the head-mounted display device for receiving the audio inputs; and
one or more image sensors for capturing image data;
a face detection program executed by a processor of the computing device, the face detection program configured to detect from the image data one or more possible faces;
a user focus program executed by a processor of the computing device, the user focus program configured to use eye-tracking data from the eye-tracking system to determine a target face on which the user is focused; and
a speech conversion program executed by a processor of the computing device, the speech conversion program configured to:
use a beamforming technique applied to at least a portion of the audio inputs from the microphone array to identify target audio inputs for speech to text conversion that are associated with the target face;
convert the target audio inputs into text;
determine if the text is related to the environment; and
if the text is related to the environment, then display the text via the transparent display of the head-mounted display device as geo-located within the environment for a predetermined period of time.

2. The speech conversion system of claim 1, wherein the speech conversion program is further configured to:
receive from one or more external sources additional audio inputs from an environment; and
use the additional audio inputs to identify the target audio inputs.

3. The speech conversion system of claim 1, wherein the face detection program is further configured to determine an identity associated with the target face.

4. The speech conversion system of claim 3, wherein the speech conversion program is further configured to:
access speech pattern data corresponding to the identity associated with the target face; and
use the speech pattern data to convert the target audio inputs into the text.

5. The speech conversion system of claim 3, wherein the displayed text is tagged to a person corresponding to the identity.

6. The speech conversion system of claim 1, further comprising a sign language program executed by a processor of the computing device, the sign language program configured to:
identify one or more of sign language letters and words from the image data;
convert the letters and words into signed text; and
display the signed text via the transparent display of the head-mounted display device.

7. The speech conversion system of claim 1, further comprising a lip reading program executed by a processor of the computing device, the lip reading program configured to:
identify from the image data of the target face movements of one or more of lips and a tongue of the target face;
convert the movements into lip read text; and
display the lip read text via the transparent display of the head-mounted display device.

8. The speech conversion system of claim 1, wherein the plurality of microphones comprise omnidirectional microphones, and the speech conversion system further comprises a speech focus program executed by a processor of the computing device, the speech focus program configured to:
identify a location from which speech is received at one or more of the omnidirectional microphones; and
using the beamforming technique applied to the speech received at the one or more omnidirectional microphones, identify the target audio inputs that are associated with the location.

9. A method for converting audio inputs from an environment into text, the audio inputs being received at a microphone array of a head-mounted display device, comprising:
capturing image data from the environment;
detecting from the image data one or more possible faces;
using eye-tracking data from an eye-tracking system of the head-mounted display device to determine a target face on which a user is focused;
using a beamforming technique applied to at least a portion of the audio inputs from the microphone array to identify target audio inputs for speech to text conversion that are associated with the target face;
converting the target audio inputs into text;
determining if the text is related to the environment; and
if the text is related to the environment, then displaying the text via a transparent display of the head-mounted display device as geo-located within the environment for a predetermined period of time.

10. The method of claim 9, further comprising:
receiving from one or more external sources additional audio inputs from the environment; and
using the additional audio inputs to identify the target audio inputs.

11. The method of claim 9, further comprising determining an identity of the target face.

12. The method of claim 11, further comprising:
accessing speech pattern data corresponding to the identity of the target face; and
using the speech pattern data to convert the target audio inputs into the text.

13. The method of claim 11, further comprising tagging the displayed text to a person corresponding to the identity.

14. The method of claim 9, further comprising:
identifying one or more of sign language letters and words from the image data;
converting the letters and words into signed text; and
displaying the signed text via the transparent display of the head-mounted display device.

15. The method of claim 9, further comprising:
identifying from the image data of the target face movements of one or more of lips and a tongue of the target face;
converting the movements into lip read text; and
displaying the lip read text via the transparent display of the head-mounted display device.

16. The method of claim 9, wherein the plurality of microphones comprise omnidirectional microphones, and further comprising:
identifying a location from which speech is received at one or more of the omnidirectional microphones; and
identifying the target audio inputs that are associated with the location using the beamforming technique applied to the speech received at the one or more omnidirectional microphones.

17. A method for converting audio inputs from an environment into text, the audio inputs being received at a microphone array of a head-mounted display device, comprising:
capturing image data from the environment;
detecting from the image data one or more possible faces;

using eye-tracking data from an eye-tracking system of the head-mounted display device to determine a target face on which a user is focused;

determining an identity of the target face;

using a beamforming technique applied to at least a portion of the audio inputs from the microphone array to identify target audio inputs that are associated with the target face;

converting the target audio inputs into text;

determining if the text is related to the environment;

if the text is related to the environment, then displaying the text via a transparent display of the head-mounted display device as geo-located within the environment for a predetermined period of time; and tagging the displayed text to a person corresponding to the identity.

18. The method of claim 17, further comprising:

accessing speech pattern data corresponding to the identity of the target face; and using the speech pattern data to convert the target audio inputs into the text.

\* \* \* \* \*